US012754583B2

(12) United States Patent
Shih et al.

(10) Patent No.: US 12,754,583 B2
(45) Date of Patent: Oct. 6, 2026

(54) BANDGAP REFERENCE CIRCUIT WITH LEAKAGE CURRENT COMPENSATION

(71) Applicant: Richtek Technology Corporation, Hsinchu (TW)

(72) Inventors: Ming-Hsien Shih, Hsinchu (TW); Tai-Wei Chang, Hsinchu (TW)

(73) Assignee: RICHTEK TECHNOLOGY CORPORATION, Hsinchu (TW)

( * ) Notice: Subject to any disclaimer, the term of this patent is extended or adjusted under 35 U.S.C. 154(b) by 0 days.

(21) Appl. No.: 19/084,732

(22) Filed: Mar. 19, 2025

(65) Prior Publication Data

US 2026/0186520 A1 Jul. 2, 2026

(30) Foreign Application Priority Data

Dec. 30, 2024 (TW) ................................ 113151571

(51) Int. Cl.
*G05F 3/26* (2006.01)
*G05F 3/30* (2006.01)

(52) U.S. Cl.
CPC ................ *G05F 3/265* (2013.01); *G05F 3/30* (2013.01)

(58) Field of Classification Search
CPC . G05F 3/265; G05F 3/20; G05F 3/205; G05F 3/26; G05F 3/267; G05F 3/222; G05F 3/225; G05F 3/245; G05F 3/30
See application file for complete search history.

(56) References Cited

U.S. PATENT DOCUMENTS

| | | | | |
|---|---|---|---|---|
| 2016/0246317 | A1 | 8/2016 | Song | |
| 2019/0129461 | A1 | 5/2019 | Sone | |
| 2020/0073429 | A1 | 3/2020 | He | |
| 2021/0349490 | A1* | 11/2021 | Krishnan | G05F 3/265 |
| 2023/0139284 | A1 | 5/2023 | Krishnan | |

FOREIGN PATENT DOCUMENTS

| | | | |
|---|---|---|---|
| CN | 108345338 | A | 7/2018 |
| CN | 111026221 | A | 4/2020 |
| CN | 111198588 | A | 5/2020 |
| CN | 115454200 | A | 12/2022 |
| JP | 2024-108518 | | 8/2024 |
| TW | 200819949 | | 5/2008 |
| TW | 201135397 | A1 | 10/2011 |
| WO | 2019/104467 | A1 | 6/2019 |

* cited by examiner

*Primary Examiner* — Jung Kim
(74) *Attorney, Agent, or Firm* — Winston Hsu

(57) ABSTRACT

A bandgap reference circuit includes: first and second bipolar junction transistors (BJT) biased at first and second current densities respectively, such that the base-emitter voltages of the first and second BJTs have a base-emitter voltage difference. The first BJT is configured to determine a negative temperature coefficient (CTAT) signal. A differential sensing resistor is series-coupled between ground potential and the second BJT to form a sub-branch, with the differential sensing resistor located closer to the ground potential side. A feedback circuit is configured to control the sub-branch and the first BJT to have the same voltage drop, such that the voltage drop across the differential sensing resistor includes the base-emitter voltage difference, thereby determining a positive temperature coefficient (PTAT) signal. The feedback circuit further generates a reference voltage with a zero temperature coefficient based on the PTAT signal and the CTAT signal.

5 Claims, 7 Drawing Sheets

BANDGAP REFERENCE CIRCUIT WITH LEAKAGE CURRENT COMPENSATION

CROSS REFERENCE

The present invention claims priority to TW 113151571 filed on Dec. 30, 2024.

BACKGROUND OF THE INVENTION

Field of Invention

The present invention relates to a bandgap reference circuit, and more particularly, to a bandgap reference circuit with leakage current compensation.

Description of Related Art

FIG. 1 illustrates a prior-art 1.2V bandgap reference voltage circuit. This circuit utilizes bipolar junction transistors (BJTs) Q1 and Q2 to generate a base-emitter voltage difference (ΔVBE) and combines a negative temperature coefficient current (Ictat1) and a positive temperature coefficient current (Iptat1) to generate a stable reference voltage Vbgp. The reference voltage Vbgp is given by:

$$Vbgp=(R2/R3)*VT*\ln(N)+VBE1.$$

Where VT is the thermal voltage, and ln(N) represents the logarithm of the area ratio between bipolar junction transistors Q2 and Q1. While this circuit provides a stable 1.2V reference voltage, its supply voltage must be higher than 1.2V, making it unsuitable for low supply voltage applications. Furthermore, in applications where the bandgap reference voltage circuit requiring extremely low quiescent currents, the P-type substrate leakage current (e.g., the leakage current Iq2*sl* from the parasitic diodes D1 and D2 between the collector and body of Q1 and Q2) affects the accuracy of the negative temperature coefficient current Ictat1 and the positive temperature coefficient current Iptat1 as the temperature increases, thereby degrading the temperature coefficient of the reference voltage.

FIG. 2 illustrates another prior-art bandgap reference voltage circuit. FIG. 2 represents an improved version of FIG. 1, aimed at achieving a bandgap reference voltage below 1V, making it suitable for low-voltage applications. In this design, feedback resistors R1 and R2 are folded to generate a zero-temperature coefficient current I2, which is mirrored via a current mirror to generate current I3 flowing through output resistor R4 to generate the reference voltage Vbgp, thereby scaling the reference voltage Vbgp to a value below 1V. The output voltage equation of this circuit structure is given by:

$$Vbgp=(R4/R2)*[(VBE1)+(R2/R3)*VT*\ln(N)].$$

From this equation, it is evident that by adjusting the ratio of resistors R4 and R2, the reference voltage Vbgp can be effectively reduced to below 1V. However, similar to FIG. 1, this design still suffers from the influence of P-type substrate leakage current, particularly under high-temperature conditions, where the leakage current causes deviations in the negative temperature coefficient current Ictat1 and the positive temperature coefficient current Iptat1, further affecting the temperature coefficient of the reference voltage Vbgp.

In view of the foregoing, the present invention aims to address the deficiencies of the prior art by providing a bandgap reference circuit that effectively reduces the impact of leakage current.

SUMMARY OF THE INVENTION

From one perspective, the present invention provides a bandgap reference circuit, comprising: a first bipolar junction transistor (BJT) biased at a first current density, configured to determine a negative temperature coefficient signal; a second bipolar junction transistor biased at a second current density, wherein the first current density is greater than the second current density, such that a base-emitter voltage of the first bipolar junction transistor and a base-emitter voltage of the second bipolar junction transistor have a base-emitter voltage difference; a differential voltage sensing resistor, connected in series between a supply potential and the second bipolar junction transistor to form a sub-branch, wherein the differential voltage sensing resistor is electrically coupled closer to the supply potential side; and a feedback circuit, configured to control the sub-branch and the first bipolar junction transistor to have the same voltage drop, such that the voltage drop across the differential voltage sensing resistor includes the base-emitter voltage difference, thereby determining a positive temperature coefficient signal; wherein the feedback circuit further generates a reference voltage with a temperature coefficient of zero based on the positive temperature coefficient signal and the negative temperature coefficient signal.

In one preferred embodiment, by configuring the differential voltage sensing resistor electrically coupled closer to the supply potential side, the voltage drop across the differential voltage sensing resistor excludes a first leakage current between the collector and the body of the second bipolar junction transistor, wherein the base of the second bipolar junction transistor is coupled to the supply potential.

In one preferred embodiment, the bandgap reference circuit further comprises a third bipolar junction transistor, wherein the base of the third bipolar junction transistor is biased in an off state, and the collector of the third bipolar junction transistor is coupled to the reference voltage, such that a second leakage current between the collector and the body of the third bipolar junction transistor compensates for the first leakage current component in the reference voltage.

In one preferred embodiment, the bandgap reference circuit further comprises a fourth bipolar junction transistor, which is connected in parallel with the first bipolar junction transistor, wherein the base of the fourth bipolar junction transistor is biased in an off state, such that a third leakage current between the collector and the body of the fourth bipolar junction transistor compensates for the first leakage current.

In one preferred embodiment, the area ratio of the first bipolar junction transistor to the second bipolar junction transistor is 1:N, and the area ratio of the first bipolar junction transistor to the fourth bipolar junction transistor is 1:(N−1), wherein N is greater than 1.

In one preferred embodiment, the feedback circuit includes: a first feedback resistor, connected in parallel with the first bipolar junction transistor, to form a first branch; a second feedback resistor, connected in parallel with the sub-branch, to form a second branch, wherein the second feedback resistor is configured to determine a negative temperature coefficient current based on the base-emitter voltage of the first bipolar junction transistor, corresponding to the negative temperature coefficient signal; an output resistor, forming a third branch; a controlled current mirror circuit, configured to generate a first bias current, a second bias current, and a third bias current in a mirrored manner based on an error amplification signal, wherein the first bias current, the second bias current, and the third bias current are respectively used to bias the first branch, the second branch, and the third branch, such that the reference voltage is generated in the third branch; and an amplifier, configured to generate the error amplification signal based on a voltage difference between the first branch and the second branch, to adjust the first to third currents; wherein the differential voltage sensing resistor determines a positive temperature coefficient current based on the base-emitter voltage difference, corresponding to the positive temperature coefficient signal; whereby the error amplification signal controls the third current to include the positive temperature coefficient current and the negative temperature coefficient current such that their temperature coefficients cancel each other, thereby making the temperature coefficient of the reference voltage close to zero.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 3A:
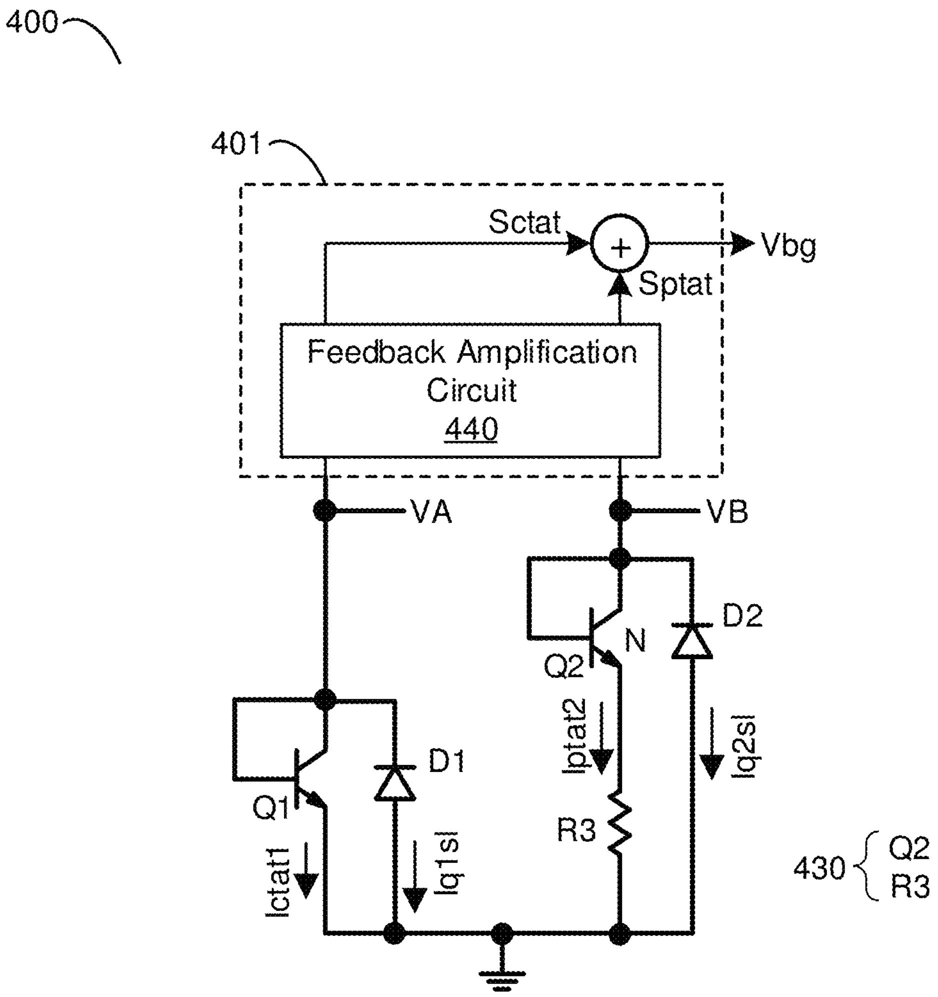
FIG. 3A illustrates a schematic circuit diagram of a bandgap reference circuit according to an embodiment of the present invention.

FIG. 3A illustrates the basic structure of a bandgap reference circuit according to an embodiment of the present invention. As shown in FIG. 3A, the bandgap reference circuit 400 comprises bipolar junction transistors (BJTs) Q1 and Q2, and a feedback circuit 401. The BJTs Q1 and Q2 are biased at different current densities, thereby generating a base-emitter voltage difference (ΔVBE). In one embodiment, the bases of BJTs Q1 and Q2 are respectively coupled to their own collectors. In one embodiment, since the area ratio of BJTs Q1 to Q2 is 1:N, where N is greater than 1, and their bias currents are, for example, equal, the current density of Q1 is greater than that of Q2.

As shown in FIG. 3A, a differential voltage sensing resistor R3 is connected in series between a supply potential and BJT Q2 to form a sub-branch 430. In this embodiment, the supply potential is the ground potential, and the differential voltage sensing resistor R3 is specifically electrically coupled closer to the supply potential (ground potential). The BJT Q2 is stacked above R3 and further coupled to the feedback circuit 401. The voltage drop across R3 includes the base-emitter voltage difference ΔVBE, thereby generating a positive temperature coefficient current Iptat2. In addition, BJT Q1 is also coupled to the feedback circuit 401.

From one perspective, the present invention configures BJTs Q1 and Q2 such that the differential voltage sensing resistor R3 is connected in series with the emitter of Q2, forming a sub-branch 430 between the supply potential and the feedback circuit 401. The emitter and collector of Q1 are coupled to the supply potential and the feedback circuit 401, respectively, while the bodies (substrates) of BJTs Q1 and Q2 are also coupled to the supply potential. Furthermore, the collectors of Q1 and Q2 are virtually shorted via the feedback circuit 401, ensuring that Q1 and sub-branch 430 have the same voltage drop. Consequently, the base-emitter voltage difference ΔVBE appears across the differential voltage sensing resistor R3. Due to the aforementioned configuration, the voltage drop across the differential sensing resistor R3 does not include the leakage current Iq2*sl* of the parasitic diode D2 between the collector and body of the bipolar junction transistor Q2. As a result, the leakage current Iq2*sl* can be effectively compensated, with further details provided later.

Additionally, it should be noted that the bipolar junction transistors (BJTs) Q1 and Q2 shown in the figures of this document are NPN transistors formed in a P-type substrate, where the substrate is coupled to a supply potential of ground or a negative voltage. In other embodiments, PNP transistors formed in an N-type substrate can also be used, where the substrate is coupled to a supply potential of a positive voltage. Embodiments using PNP transistors can achieve the same effects as described in the present invention, which would be apparent to those skilled in the art.

The feedback circuit 401 includes a feedback amplification circuit 404, which, through feedback control, ensures that sub-branch 430 and BJT Q1 have the same voltage drop, such that the voltage drop across the differential voltage sensing resistor R3 corresponds to the base-emitter voltage difference ΔVBE. This generates a positive temperature coefficient signal Sptat and a negative temperature coefficient signal Sctat. The feedback circuit 401 further combines the positive temperature coefficient signal Sptat and the negative temperature coefficient signal Sctat to generate a reference voltage Vbg with a temperature coefficient equal to, or at least close to, zero.

Figure 3B:
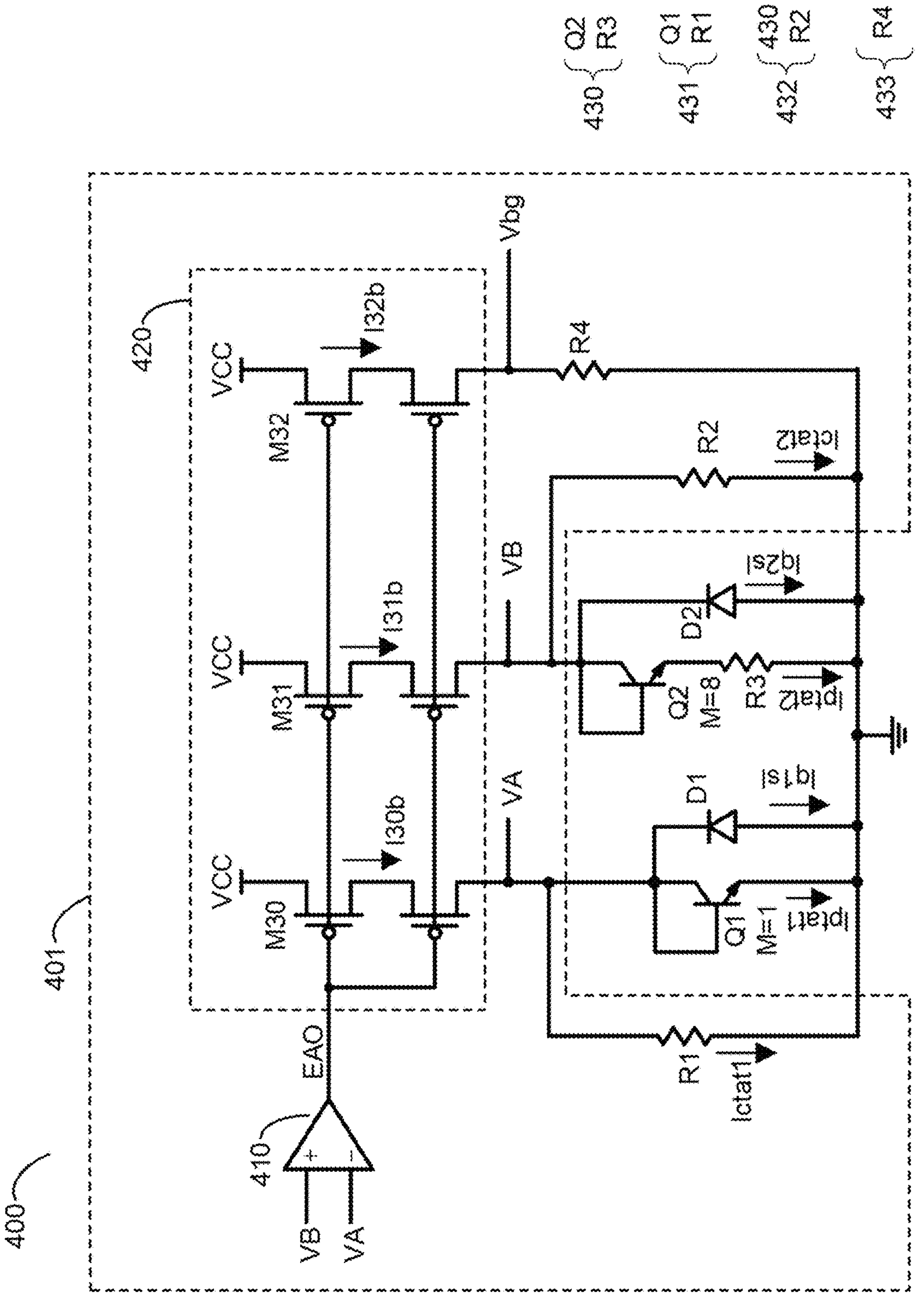
FIG. 3B illustrates a specific schematic diagram of the bandgap reference circuit according to an embodiment of the present invention.

Please refer to FIG. 3B. FIG. 3B corresponds to FIG. 3A a illustrates a specific implementation of the bandgap reference circuit. As shown in FIG. 3B, the feedback circuit 401 includes an amplifier 410, a controlled current mirror circuit 420, and feedback resistors R1 and R2. The feedback resistor R1 is connected in parallel with BJT Q1, forming a first branch 431. The feedback resistor R1 determines a negative temperature coefficient current Ictat1 based on the base-emitter voltage of BJT Q1. The feedback resistor R2 is connected in parallel with the sub-branch 430, forming a second branch 432. The feedback resistor R2 determines a negative temperature coefficient current Ictat2 based on the base-emitter voltage of BJT Q1. The positive temperature coefficient current Iptat2 corresponds to the positive temperature coefficient signal Sptat, and the negative temperature coefficient current Ictat2 corresponds to the negative temperature coefficient signal Sctat. An output resistor R4 forms a third branch 433.

The amplifier 410 generates an error amplification signal EAO based on the voltage difference between VA and VB of the first branch 431 and the second branch 432. The controlled current mirror circuit 420 generates mirrored currents I30*b*, I31*b*, and I32*b* based on the error amplification signal EAO. These mirrored currents are configured to bias the first branch 431, second branch 432, and third branch 433, respectively, to generate the voltages VA and VB, and the reference voltage Vbg. The voltages VA and VB are virtually shorted due to the negative feedback control of amplifier 410, ensuring they have the same voltage.

By properly designing the ratio of feedback resistor R2 to differential voltage sensing resistor R3, the bandgap reference circuit 400, through the feedback mechanism of amplifier 410, adjusts the controlled current mirror circuit 420 such that the temperature coefficients of the negative temperature coefficient current Ictat2 and the positive temperature coefficient current Iptat2 across R3 cancel each other out. This results in the mirrored currents I30*b*, I31*b*, and I32*b* having a zero temperature coefficient, thereby ensuring that the reference voltage Vbg generated across the output resistor R4 also has a zero temperature coefficient.

Figure 3C:
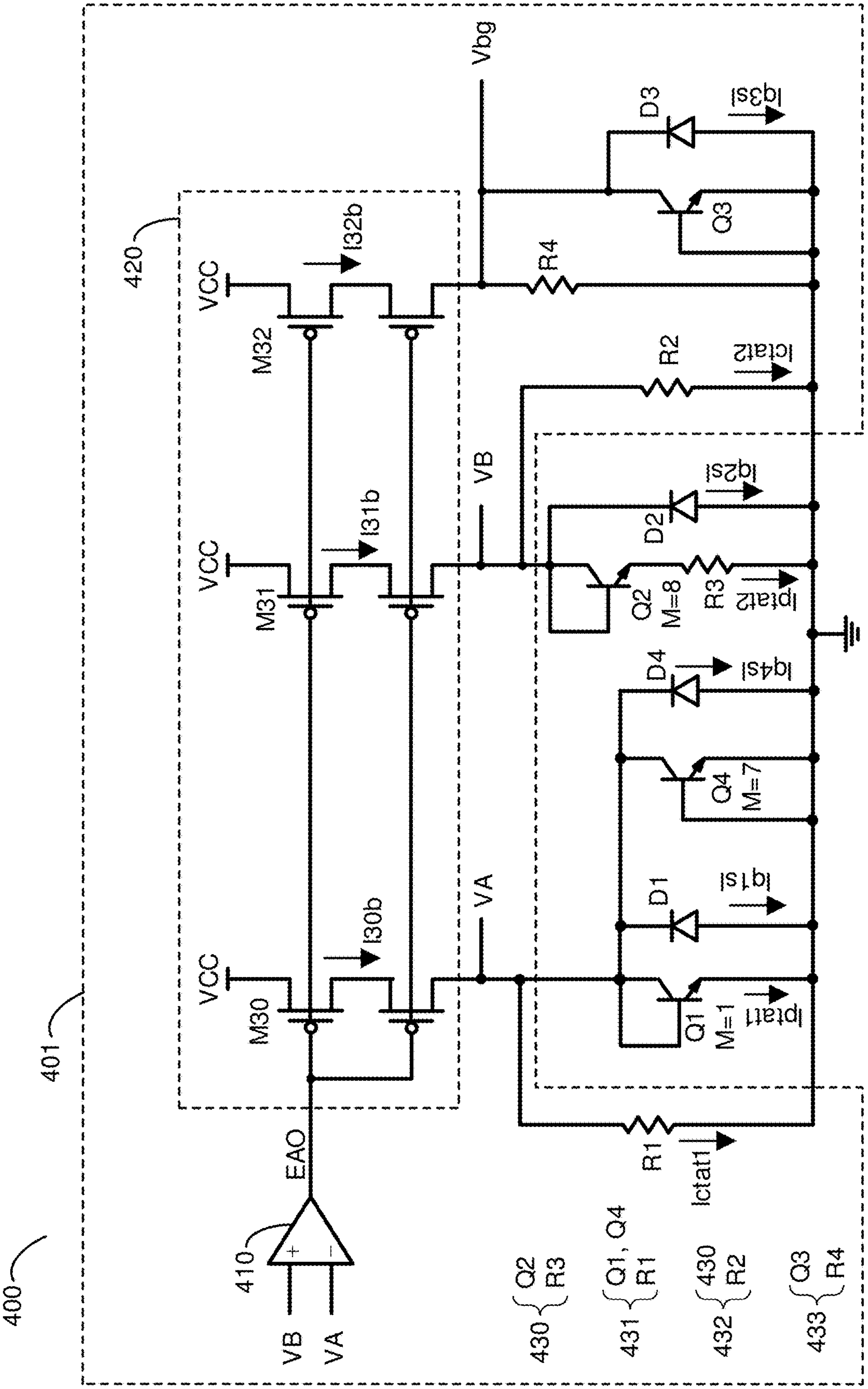
FIG. 3C illustrates a schematic circuit diagram of a bandgap reference circuit with a complete compensation structure according to an embodiment of the present invention.

Please refer to FIG. 3C. FIG. 3C illustrates a bandgap reference circuit with a more complete compensation structure. This embodiment is similar to the embodiment shown in FIG. 3B, and differs in that this embodiment additionally includes a compensation element, the bipolar junction transistor Q3. In this embodiment, the third branch 433 further includes BJT Q3, whose base is coupled to ground, biasing it in an off state, and whose collector is coupled to the reference voltage Vbg.

Referring back to FIG. 3B, in the bandgap reference circuit 400 of FIG. 3B, due to the previously described configuration, the voltage drop across the differential voltage sensing resistor R3 does not include the leakage current Iq2*sl* from the parasitic diode D2 between the collector and body of BJT Q2. Instead, it purely reflects the base-emitter voltage difference ΔVBE. Thus, the positive temperature coefficient current Iptat2 flowing through R3 can maintain a purely positive temperature coefficient. However, the summed current I31*b* still includes the leakage current Iq2*sl* of the parasitic diode D2, which is also mirrored into current I32*b* and consequently appears in the reference voltage Vbg. Therefore, in the embodiment shown in FIG. 3C, the leakage current Iq3*sl* of BJT Q3 is utilized to compensate for the leakage current component Iq2*sl* present in current I32*b*, further reducing the impact of P-type substrate leakage current on the reference voltage Vbg.

In one embodiment, the first branch 431 in FIG. 3C further includes a bipolar junction transistor Q4, which is connected in parallel with BJT Q1. The base of BJT Q4 is also biased in an off state. Although the currents I30*b* and I31*b* in the first and second branches 431 and 432 are configured to have a predetermined ratio (e.g., 1:1), the different areas of BJTs Q1 and Q2 cause their leakage currents Iq1*sl* and Iq2*sl* to differ. In the embodiment shown in FIG. 3B, this discrepancy results in the current density of BJTs Q1 and Q4 deviating from the intended ratio.

Thus, as shown in FIG. 3C, BJT Q4 is used to compensate for the leakage current difference between Iq2*sl* and Iq1*sl*. Specifically, in a preferred embodiment, the area of BJT Q4 is configured to match the difference in area between BJTs Q2 and Q3. For example, if the area ratio of BJT Q1 to Q2 is 1:N, then the area ratio of BJT Q1 to Q4 is configured to 1:(N−1).

Figure 1:
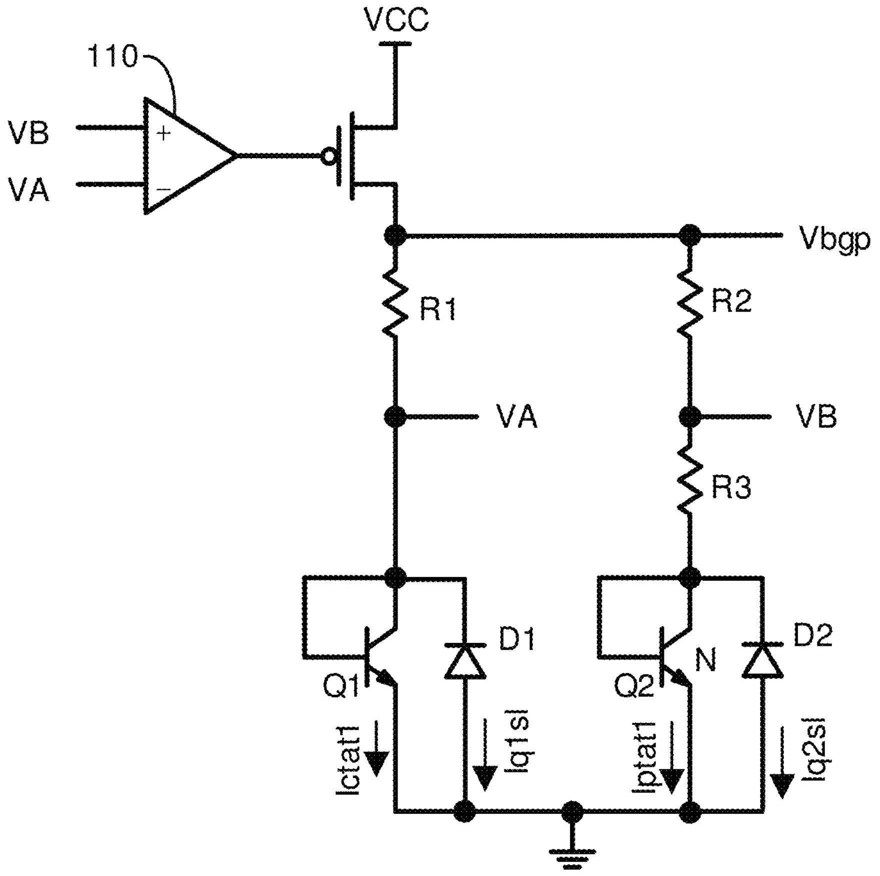
FIG. 1 (prior art)
FIG. 1 illustrates a schematic circuit diagram of a prior-art bandgap reference voltage circuit.
Figure 2:
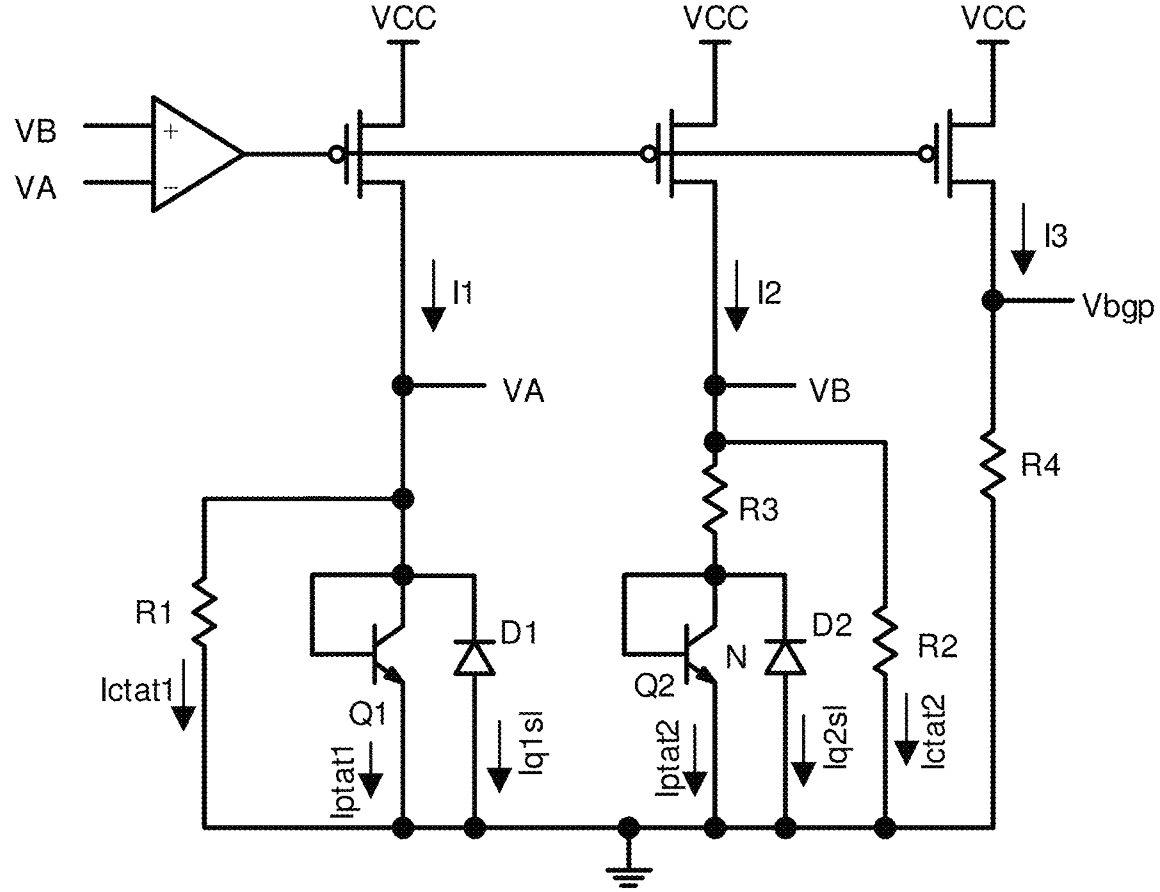
FIG. 2 (prior art)
FIG. 2 illustrates another prior-art bandgap reference voltage circuit.
Figure 4:
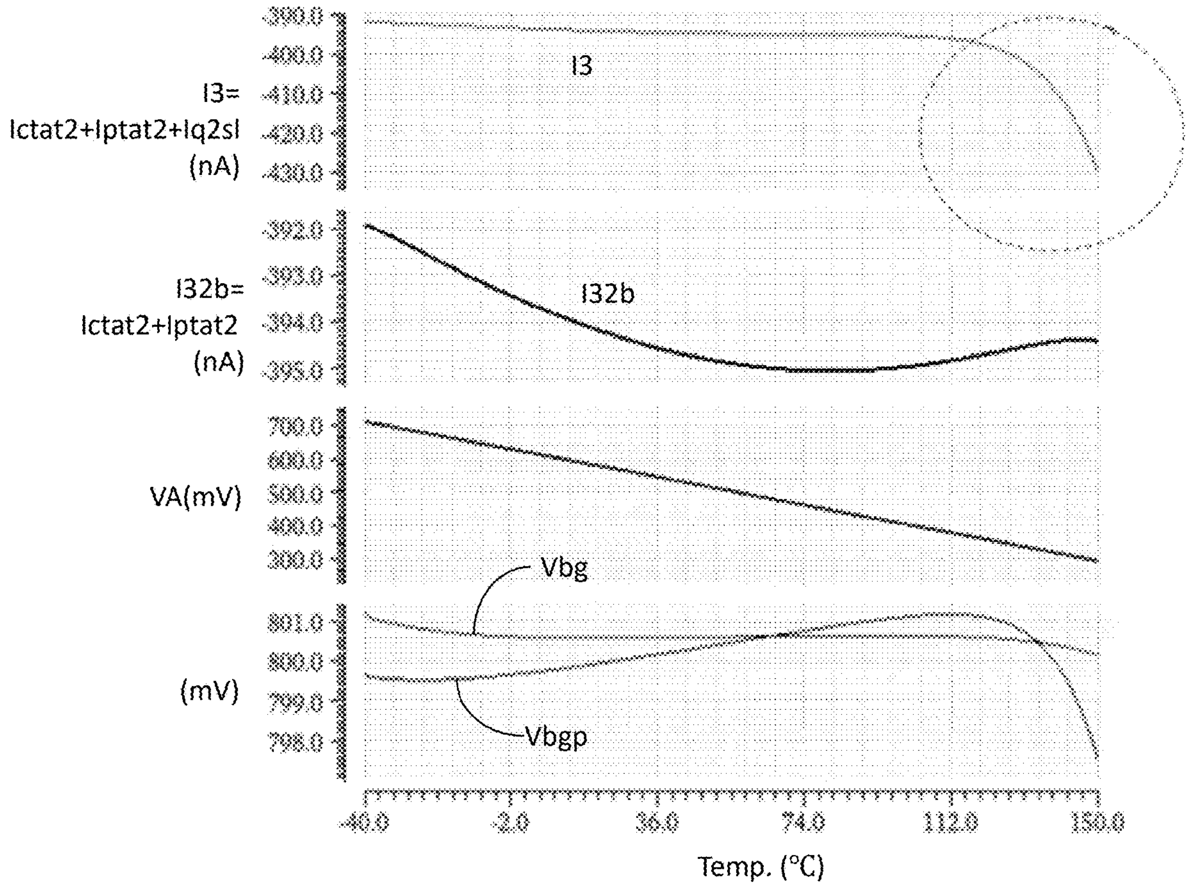
FIG. 4 illustrates an operational waveform diagram of the bandgap reference circuit according to an embodiment of the present invention.

FIG. 4 illustrates an operational waveform diagram according to one embodiment of the present invention. The reference voltage Vbg is generated by the bandgap reference circuit 400 shown in FIG. 4, whereas the reference voltage Vbgp is generated by the prior-art bandgap reference circuit (such as in FIG. 2). As shown in FIG. 4, since the current I3 of the prior art flows through output resistor R4 is proportional to Ictat2+Iptat2+Iq2*sl*, it exhibits significant variations at high temperatures (as indicated by the dashed curves). Consequently, the reference voltage Vbgp also shows a large temperature coefficient variation at high temperatures.

On the other hand, in the bandgap reference circuit 400 of FIG. 4, the current I32*b* flowing through output resistor R4 is proportional to Ictat2+Iptat2, which remains relatively stable even at high temperatures. As a result, the reference voltage Vbg exhibits a much flatter response to temperature, compared to Vbgp.

From the above embodiments, it is evident that the present invention effectively mitigates the impact of substrate leakage current in applications with extremely low bias currents while maintaining a low temperature coefficient for the reference voltage Vbg in the range of −40° C. to 150° C. Compared to the prior art, where the reference voltage Vbgp curve drops sharply at high temperatures, the present invention precisely eliminates the effect of P-type substrate leakage current through the positioning of differential voltage sensing resistor R3 and the introduction of BJTs Q3 and Q4, thereby achieving more accurate and linear temperature compensation.

Figure 5:
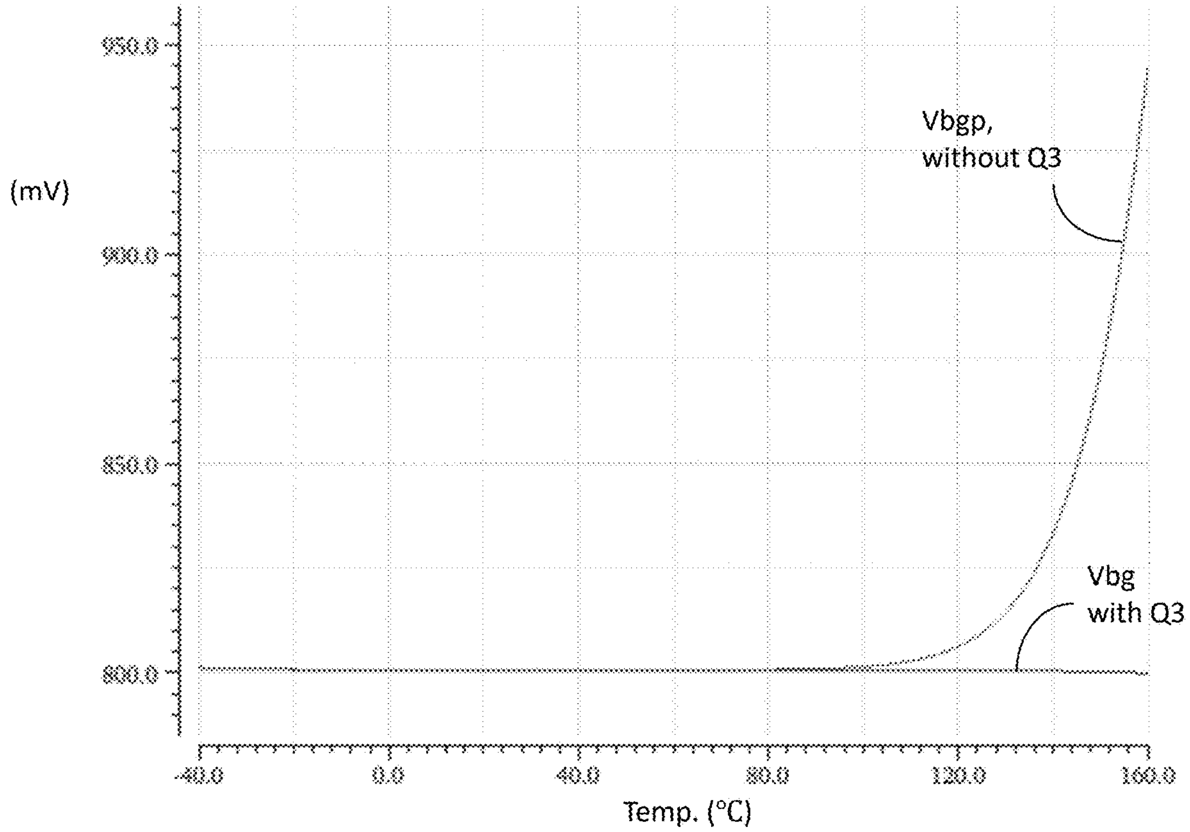
FIG. 5 illustrates another operational waveform diagram of the bandgap reference circuit according to an embodiment of the present invention.

FIG. 5 illustrates another operational waveform diagram according to an embodiment of the present invention. As shown in FIG. 5, the nearly horizontal line represents the reference voltage Vbg generated by the bandgap reference circuit incorporating BJT Q3, whereas the upward-sloping line in the high-temperature region represents the reference voltage Vbgp generated by a bandgap reference circuit without BJT Q3. As shown in FIG. 5, the reference voltage Vbg generated by the bandgap reference circuit with the bipolar junction transistor Q3 is significantly more stable compared to the reference voltage Vbgp generated by the bandgap reference circuit without the bipolar junction transistor Q3.

The reference voltage vbg in the embodiment utilizing BJT Q3 for compensating the leakage current of BJT Q2 can be expressed as:

$$Vbg=R4*(\mathrm{Ictat2}+\mathrm{Iptat2}+Iq2sl-Iq3sl)$$

From this equation, it is evident that the leakage current Iq3*sl* of BJT Q3 can accurately compensate for the leakage current Iq2*sl* of BJT Q2. The placement of the differential voltage sensing resistor R3 ensures that the base-emitter voltage difference ΔVBE is no longer affected by leakage current, thereby maintaining the stability of the reference voltage Vbg over a wide temperature range, making it particularly suitable for high-precision, low-power, and wide-temperature-range applications.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-tovoltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be configured together, or, a part of one embodiment can be configured to replace a corresponding part of another embodiment. In view of the foregoing, the spirit of the present invention should cover all such and other modifications and variations, which should be interpreted to fall within the scope of the following claims and their equivalents.

What is claimed is:

1. A bandgap reference circuit, comprising:

a first bipolar junction transistor (BJT) biased at a first current density, configured to determine a negative temperature coefficient signal;

a second bipolar junction transistor biased at a second current density, wherein the first current density is greater than the second current density, such that a base-emitter voltage of the first bipolar junction transistor and a base-emitter voltage of the second bipolar junction transistor have a base-emitter voltage difference;

a third bipolar junction transistor, wherein a base of the third bipolar junction transistor is biased in an off state, and a collector of the third bipolar junction transistor is coupled to a reference voltage, such that a second leakage current between the collector and a body of the third bipolar junction transistor compensates for a first leakage current component in the reference voltage;

a differential voltage sensing resistor, connected in series between a supply potential and the second bipolar junction transistor to form a sub-branch, wherein the differential voltage sensing resistor is electrically coupled closer to the supply potential side; and a feedback circuit, configured to generate the reference voltage and to control the sub-branch and the first bipolar junction transistor to have the same voltage drop, such that the voltage drop across the differential voltage sensing resistor includes the base-emitter voltage difference, thereby determining a positive temperature coefficient signal.

2. The bandgap reference circuit of claim 1, wherein by configuring the differential voltage sensing resistor electrically coupled closer to the supply potential side, the voltage drop across the differential voltage sensing resistor excludes a first leakage current between the collector and the body of the second bipolar junction transistor, wherein the base of the second bipolar junction transistor is coupled to the supply potential.

3. The bandgap reference circuit of claim 2, further comprising a fourth bipolar junction transistor, which is connected in parallel with the first bipolar junction transistor, wherein the base of the fourth bipolar junction transistor is biased in an off state, such that a third leakage current between the collector and the body of the fourth bipolar junction transistor compensates for the first leakage current.

4. The bandgap reference circuit of claim 3, wherein the area ratio of the first bipolar junction transistor to the second bipolar junction transistor is 1:N, and the area ratio of the first bipolar junction transistor to the fourth bipolar junction transistor is 1:(N−1), wherein N is greater than 1.

5. The bandgap reference circuit of claim 1, wherein the feedback circuit includes:

a first feedback resistor, connected in parallel with the first bipolar junction transistor, to form a first branch;

a second feedback resistor, connected in parallel with the sub-branch, to form a second branch, wherein the second feedback resistor is configured to determine a negative temperature coefficient current based on the base-emitter voltage of the first bipolar junction transistor, corresponding to the negative temperature coefficient signal;

an output resistor, forming a third branch;

a controlled current mirror circuit, configured to generate a first bias current, a second bias current, and a third bias current in a mirrored manner based on an error amplification signal, wherein the first bias current, the second bias current, and the third bias current are respectively used to bias the first branch, the second branch, and the third branch, such that the reference voltage is generated in the third branch; and an amplifier, configured to generate the error amplification signal based on a voltage difference between the first branch and the second branch, to adjust the first to third currents;

wherein the differential voltage sensing resistor determines a positive temperature coefficient current based on the base-emitter voltage difference, corresponding to the positive temperature coefficient signal;

whereby the error amplification signal controls the third current to include the positive temperature coefficient current and the negative temperature coefficient current such that their temperature coefficients cancel each other, thereby making a temperature coefficient of the reference voltage close to zero.

* * * * *